G. Pine,
Napkin Ring.

No. 75,968.   Patented Mar 24. 1868

Witnesses.
H. C. Aschkettler
Wm A Morgan

Inventor.
G. Pine
per Munn &co
Attorneys

United States Patent Office.

GEORGE PINE, OF TRENTON, NEW JERSEY, ASSIGNOR TO HIMSELF AND E. R. COOK, OF SAME PLACE.

*Letters Patent No. 75,968, dated March 24, 1868.*

IMPROVED NAPKIN-RING AND SALT-CUP COMBINED.

*The Schedule referred to in these Letters Patent and making part of the same.*

TO ALL WHOM IT MAY CONCERN:

Be it known that I, GEORGE PINE, of Trenton, in the county of Mercer, and State of New Jersey, have invented a new and improved Combined Napkin-Ring and Salt-Cup; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
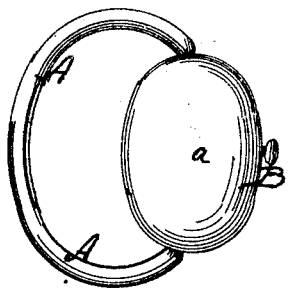
Figure 1 represents a plan or top view of my improved napkin-ring.

This invention relates to a new napkin-ring or holder, which is combined with a salt-cup in such a manner that each person at table can have his or her own salt-cup, thereby doing away with the necessity of taking the salt from a common salt-cellar.

The salt-cup is attached, in any suitable manner, to the napkin-ring, and is provided with a well-closing cover, so that the salt cannot fall out.

A, in the drawing, represents a napkin-ring or holder of proper construction. To the same is secured a small box, B, which has a lid or cover, a, that can be held closed by a spring or otherwise. The box B may be attached to the inner or outer face of the ring or holder, or may form part of the rim of the same, as may be desired.

Figure 2:
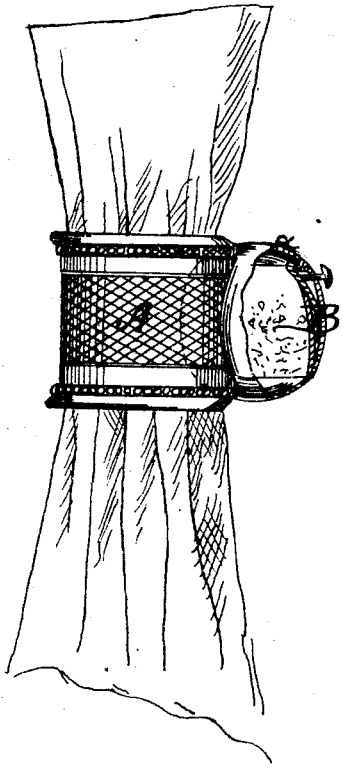
Figure 2 is a side view of the same.

In fig. 1, the device is shown as being in position to be used for a salt-cup, while in fig. 2 it is the napkin-ring.

I do not confine myself to any particular method or design of combining the salt-cap with a napkin-ring or holder; but I do claim as new, and desire to secure by Letters Patent—

A salt-cup and napkin-ring or holder combined, substantially as herein shown and described.

GEORGE PINE.

Witnesses:
A. V. BRIESEN,
E. R. COOK.